Figure 6:
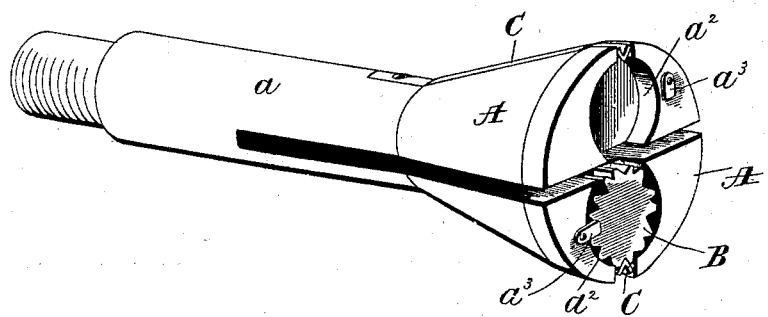

(No Model.) 2 Sheets—Sheet 1.
J. R. HOPKINS.
SPINDLE CHUCK.
No. 489,006. Patented Jan. 3, 1893.
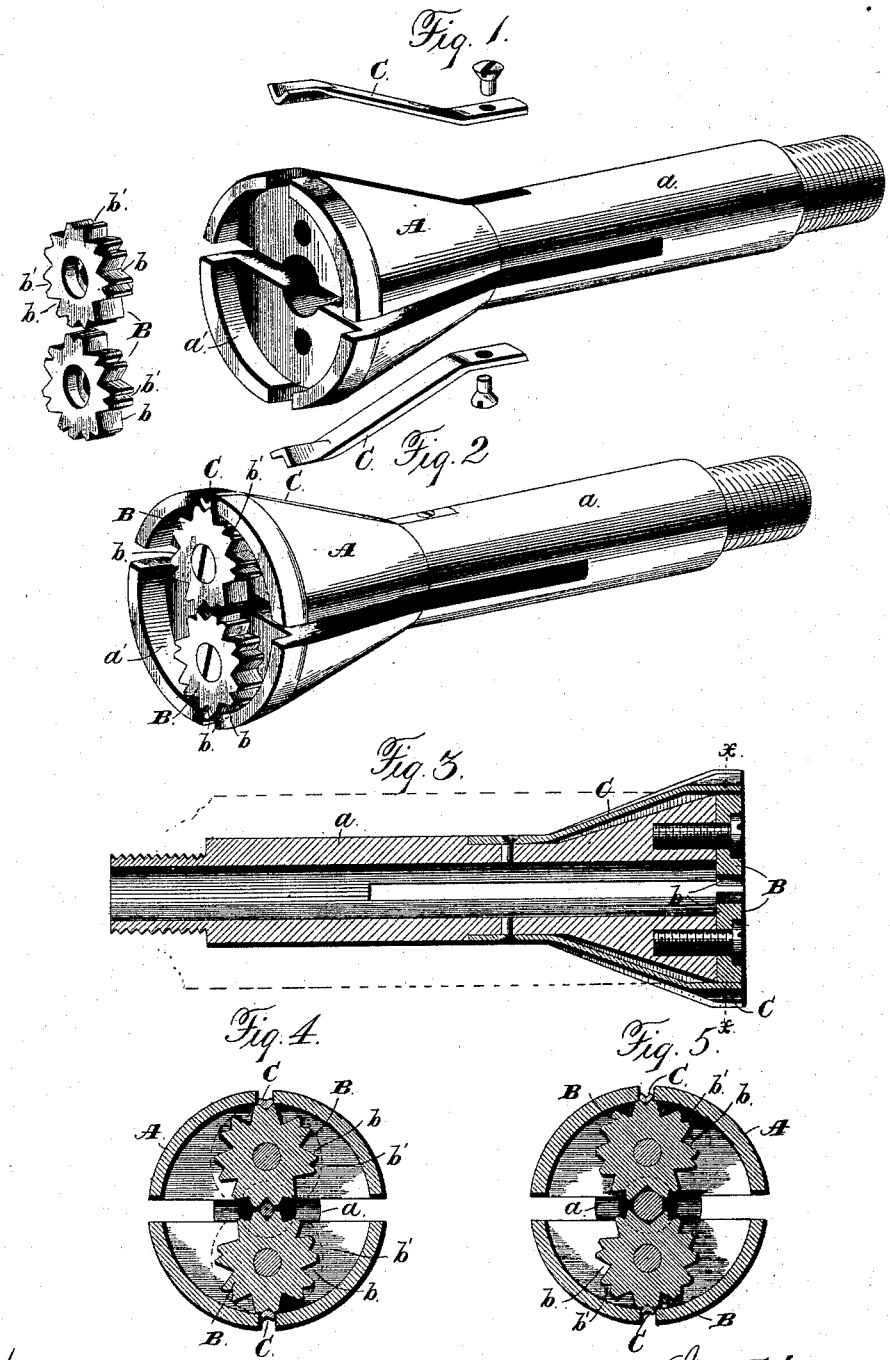

(No Model.) 2 Sheets—Sheet 2.

J. R. HOPKINS.
SPINDLE CHUCK.

No. 489,006. Patented Jan. 3, 1893.

UNITED STATES PATENT OFFICE.

JASON R. HOPKINS, OF WASHINGTON, DISTRICT OF COLUMBIA, ASSIGNOR OF ONE-HALF TO GEORGE S. PRINDLE AND PHILIP G. RUSSELL, OF SAME PLACE.

SPINDLE-CHUCK.

SPECIFICATION forming part of Letters Patent No. 489,006, dated January 3, 1893.

Application filed January 10, 1890. Serial No. 336,481. (No model.)

*To all whom it may concern:*

Be it known that I, JASON R. HOPKINS, of Washington, in the District of Columbia, have invented certain new and useful Improvements in Spindle-Chucks; and I do hereby declare that the following is a full, clear, and exact description thereof, reference being had to the accompanying drawings, in which—

Figure 1 is a perspective view of the parts of my chuck separated from each other; Fig. 2 is a like view of the same when combined; Fig. 3 is a central longitudinal section of said chuck when in use, Figs. 4 and 5 are cross sections upon line $x\ x$ of Fig. 3 and show the chuck in use upon articles having extremes of diameter, and Fig. 6 is a perspective view of a modification of my chuck.

Letters of like name and kind refer to like parts in each of the figures.

The object of my invention is, to increase the capacity of a spindle chuck so as to enable it to receive and hold articles which have materially different sizes, and to such end my invention consists, principally, in combining with a spindle chuck separately formed jaws which are attached thereto and may be turned to cause different portions of their peripheries to come into juxtaposition, substantially as and for the purpose hereinafter specified.

It consists, further, in combining with a spindle chuck disk shaped jaws which within their peripheries are provided with holding notches that have different relative dimensions and are arranged so as to permit either of the notches of one disk to be brought into coincidence with the corresponding notch of the other disk, substantially as and for the purpose hereinafter shown.

It consists, finally, in the combination of the spindle chuck, the rotatable jaws and means for locking such jaws in position, substantially as and for the purpose hereinafter set forth.

In the carrying of my invention into practice, I employ a chuck which is known as a spindle or split chuck and consists essentially of a head A from which extends axially rearward a round hollow shank $a$. Said head has a tapering form, from or near its outer end to its junction with said shank and is divided longitudinally into two parts, as shown. The chuck described is fitted into an axial opening in a lathe spindle as indicated in dotted lines in Fig. 3, which correspond thereto in size and shape and by means of a rod or pipe that engages with the rear end of the shank, is adapted to be moved longitudinally rearward so as to compress the head, or to be moved longitudinally forward so as to release said head and permit it to expand to its normal size.

Within the front end of the head A is formed a recess $a'$ and within the same—upon each of the sections, is pivoted a disk B that has a diameter slightly less than one half the diameter of said recess and within its periphery is provided with a series of V shaped notches $b$ and $b$ that have different relative dimensions and are, preferably, arranged around said periphery in the order of their size. The outer edge of each disk B is in contact with and supported by the adjacent portion of the periphery of the recess $a'$, while at a point directly opposite, said disk nearly comes into contact with the corresponding portion of the opposite disk. If now said disks are turned until any one of the notches of one disk comes opposite to and coincides with the corresponding notch of the other disk, and a rod of suitable size be placed within the same, such rod may be firmly clamped by drawing the chuck into its spindle so as to compress the head. The notched disks B and B thus constructed and used form the jaws of the chuck and by turning them to proper position will enable any rod to be clamped therein which has a diameter between the dimensions of the coinciding smallest notches and the coinciding largest notches. For convenience I provide for each disk a spring detent C that is secured to the head A and engages with small peripheral notches $b'$ and $b'$ which are formed in the spaces between the notches $b$ and $b$.

If desired, as shown in dotted lines in Figs. 5, and in Fig. 6, each of the disk jaws may be placed within a circular recess $a^2$ that is but slightly larger than such jaw, in which event the pivotal screw would be unnecessary and a simple lug or plate $a^3$ bearing upon the outer face of the disk would operate to confine it in place.

Having thus described my invention, what I claim is—

1. In combination with a chuck having two relatively movable parts, a jaw carried by each of said parts and adapted to be moved to place different portions of its periphery into juxtaposition with the periphery of the other jaw, said jaw-carrying part having a portion overhanging and adapted to engage the outer periphery of its jaw at a point diametrically opposite the similarly engaged part of the other jaw and on a line passing through the centers of both jaws, substantially as and for the purpose shown.

2. In combination with a split chuck having two sections whose outer faces are recessed, a disk carried in the recessed face of each section, and adapted to have different portions of its periphery placed into juxtaposition with the periphery of the other disk, and the wall or flange formed by recessing said sections overhanging and engaging the outer edges of said disks at points diametrically opposite on a line passing through the centers of both disks, substantially as and for the purpose shown and described.

3. In combination with a chuck having its head divided into two longitudinal sections that are adapted to be moved toward or from each other, two disks which are provided with peripheral notches that have different relative dimensions and are pivoted upon or within the outer ends of said head sections, substantially as and for the purpose set forth.

4. In combination with a chuck which has its head divided longitudinally into two sections that are adapted to be moved toward or from each other, a disk jaw which is pivoted upon or within each section and is provided with peripheral notches and a spring detent that is adapted to engage with and lock said jaw in circumferential position, substantially as and for the purpose shown and described.

In testimony that I claim the foregoing I have hereunto set my hand this 19th day of December, 1889.

JASON R. HOPKINS.

Witnesses:
HENRY C. HAZARD,
CHAS. J. WILLIAMSON.